May 4, 1937.  G. HERBSTER  2,079,067
HEAT EXCHANGING APPARATUS
Filed Nov. 19, 1935
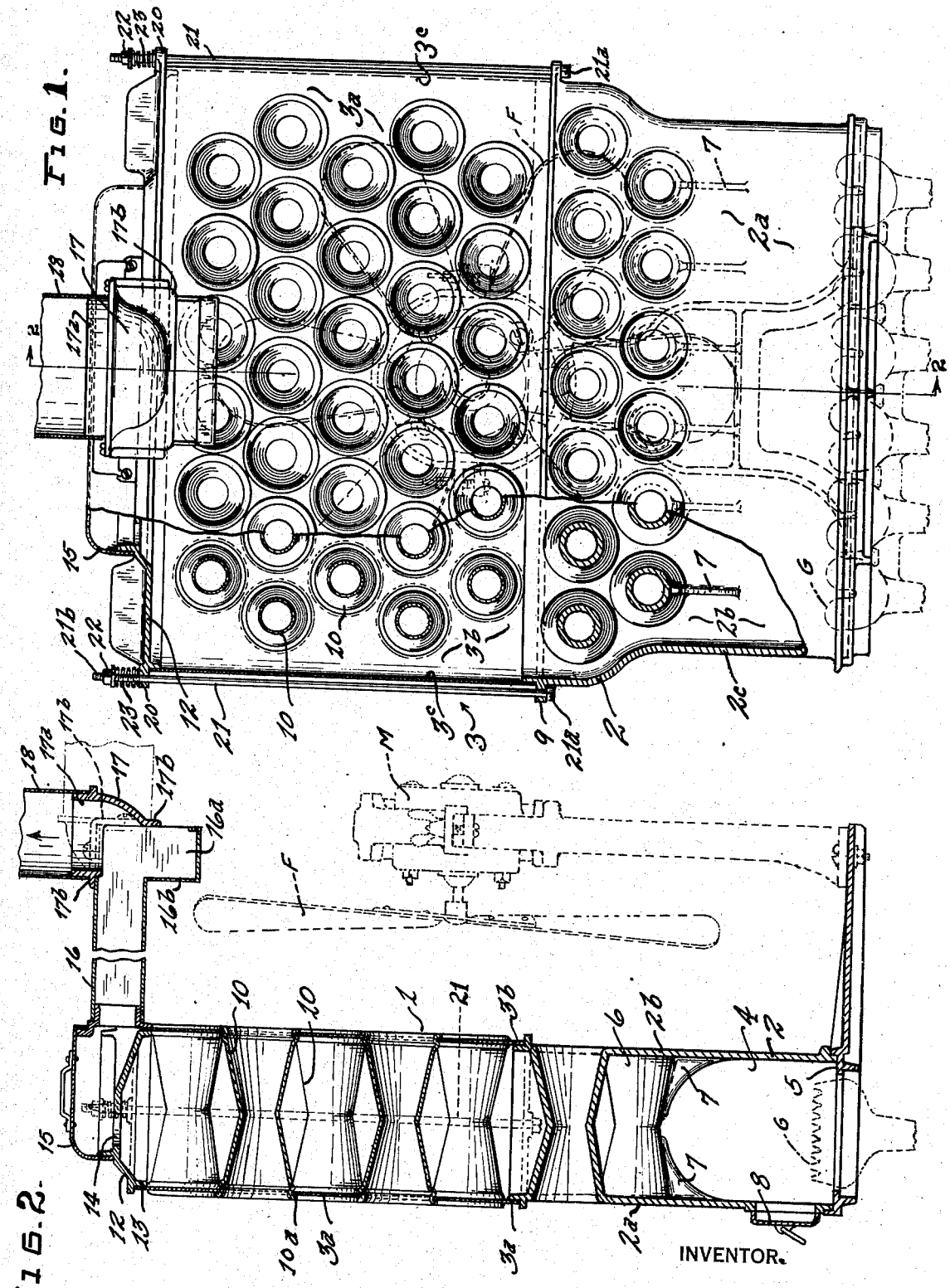
INVENTOR.
GEORGE HERBSTER
by:- J. Harrow Leonard,
his ATTORNEY Patented May 4, 1937

2,079,067

UNITED STATES PATENT OFFICE 2,079,067

HEAT EXCHANGING APPARATUS

George Herbster, Cleveland, Ohio, assignor to The Cleveland Cooperative Stove Company, Cleveland, Ohio, a corporation of Ohio Application November 19, 1935, Serial No. 50,576

4 Claims. (Cl. 257—171)

This invention relates to a heat exchanging apparatus and particularly to an improvement in a heat exchanger such as described and claimed in my United States Letters Patent No. 2,023,136, issued December 3, 1935.

In heat exchangers of this general character, the heating media are usually introduced from one end of the exchanger and flow entirely therethrough and discharge at the opposite end. As a result, that portion of the exchanger adjacent to the point of introduction of the heating media is subjected to greater temperatures than the portion more remote therefrom. Consequently, several problems are involved. First, the portion of the exchanger which is subjected to the highest temperature must be made to withstand the temperature to which subjected. If the remainder of the exchanger is made of a quality and of characteristics for withstanding the same high temperatures, the cost of materials and labor involved in commercial production of the exchanger is unduly increased with no accompanying increase in advantages obtained, but, on the contrary, with a decrease in effectiveness of operation. If the same material is used throughout, there is an added disadvantage in that too much of the heat may be absorbed by the material nearest the point of introduction of the media and first subjected thereto. This heat, in turn, may be radiated too rapidly into the air sweeping this portion of the exchanger. Consequently, the air discharged past the exchanger and heated thereby is not uniformly heated, but issues as strata or currents of intensely heated air near the highly heated portions, and strata of gradually diminishing temperature at portions progressively distant from the highly heated portion, due to the fact that so much of the heat of the media has been removed in the first instance that the remainder of the exchanger receives inadequate heat.

Secondly, the heat radiating, absorptive, and conduction characteristics of materials differ widely for different materials. If a material having lower heat absorptive and radiating characteristics is used adjacent the point of introduction of the heating media so as to eliminate concentration of heat in the passing air, and a material having higher absorptive and radiating characteristics is used at other portions of the exchanger, differentials in temperature of the materials occur.

In attempting to balance the absorptive and radiating capacities of different materials with the temperatures of the heating media to which each is subjected so as to obtain uniform heating of the air, differentials in expansion become critical and the field of materials available is reduced further.

It is one of the principal objects of the present invention to provide a heat exchanger capable of heating uniformly a stream of air or other fluid which is passed therethrough.

A more specific object is to provide a heat exchanger having a plurality of uniformly distributed passages for the passage of air or fluid to be heated, the portions of the head being so arranged and related that the air discharged from all of the passages is substantially uniform in temperature.

Another specific object is to provide a more efficient heat conducting and radiating material in those parts of the exchanger remote from the point of introduction of heating media than at those portions adjacent the point of introduction and, at the same time, to provide a material adjacent the point of introduction of the heating media which is capable of withstanding the higher temperatures without deterioration.

A correlative object is to compensate for expansion between the different materials of which the different portions of the exchanger are composed.

Still another object is to provide an improved adapter for connection between the exchanger and exhaust flue which can be readily installed for connecting the exchanger to a vertical or horizontal flue.

Another object is to provide ready access into the exchanger for purposes of cleaning the interior portions through which the heating media pass.

Other objects and advantages will become apparent from the following specification wherein reference is made to the drawings in which Fig. 1 is a rear elevation of a heat exchanger embodying the principles of the present invention, part thereof being shown in section for clearness in illustration; and Fig. 2 is a vertical sectional view taken on a plane indicated by the line 2—2 of Fig. 1.

As more fully set forth in my United States Letters Patent No. 2,023,136, issued December 3, 1935, the present heat exchanger is one in which the heating media are introduced into the interior, the exchanger being provided with a plurality of transversely extending tubes for the passage of air or other fluid to be heated, the tubes being uncommunicated with the interior of the exchanger so as to exclude the introduction of any heating media thereinto. Air or other fluid is forced through the tubes by a suitable fan for carrying away the heat radiated by the tubes.

The exchanger shown by way of illustration and designated generally as 1, is comprised of a plurality of sections, two of which are shown for purposes of illustration, these two being a lower section 2 and an upper superimposed section 3. The lower section 2 comprises a generally box-like structure having an upright front wall 2a, and upright rear wall 2b, and end walls 2c. The section is open at the bottom so as to provide a combustion chamber 4, into which heating media are introduced.

In the form illustrated, the heating media are supplied by a plurality of gas burners G, the secondary air being admitted between the burners G and the rudimentary bottom wall 5 of the section 2.

The bottom section 2 has a plurality of Venturi tubes or passages 6 which extend from the rear wall 2b to the front wall 2a, each tube 6 being open at its ends and terminating in the planes of the walls 2a and 2b respectively. A plurality of rows of such tubes are provided, each row being staggered with respect to the row therebeneath so that the heating media is constrained by each row to pass completely around each tube of the row therebeneath and into intimate contact therewith, as more fully described in the United States Letters Patent above identified. The tubes 6 are sealed with respect to the walls 2a and 2b so that none of the heating media can enter the tubes but must pass only around the tube surfaces exposed within the exchanger.

The tubes 6 of the bottom row, which, in the exchanger illustrated, are first exposed to the heating media, are provided with heat transfer fins 7 which extend along the tubes and along the walls 2a and 2b so as to conduct heat from the walls into the tubes wherein it can be more readily removed, thus preventing excessive radiation from the walls. The lower section 2, including the tubes, the walls, and the fins 7, is preferably cast as an integral piece, grey iron preferably being used. The walls thereof and all of the parts are correspondingly relatively thick both for withstanding comparatively high temperatures and for reducing the rate of absorption and radiation of heat. As illustrated, the bottom row of tubes 6 is spaced sufficiently far above the burner G to prevent a direct impingement of the burning mixture from the burners thereon, and resultant carbonaceous deposits and creation of carbon monoxide.

A suitable door 8 is provided in the front wall 2a to permit access to the burners G for service, cleaning and lighting.

For purposes of illustration, the head section 2 includes two rows of tubes 6 and is open at the top. Adjacent the upper margin thereof the section 2 has a peripheral flange 9 forming an upwardly facing horizontal shoulder.

The upper section 3 of the heat exchanger comprises front and rear walls 3a and 3b respectively, and end walls 3c. The upper section is provided with a larger number of rows of Venturi tubes 10 which extend from front to rear thereof and are likewise sealed with respect to the interior of the section 3 so as to prevent entrance of products of combustion thereinto. As better illustrated in Fig. 2, each of the tubes 10 is spun from sheet metal and flanged over at the ends as indicated at 10a to engage the edge margins defining the openings for the tubes through the front wall. The rows of tubes 10 are likewise staggered with respect to each other for the purposes heretofore set forth with respect to the tubes 6.

The section 3 is open at the top and at the bottom, the lower margins of the walls thereof being in telescoping sealed relation with respect to the upper margins of the walls of the section 2, the upper section being supported in proper vertical position by resting upon the flange 9 of the lower section. The section 3 and tubes 10 are made of a relatively light gauge sheet metal, preferably sheet aluminum, instead of cast iron or other cast material so that the heat may be absorbed and conducted more readily by the tubes and walls and more rapidly radiated into the passing air. By the use of these materials for the sections, compensation for the fact that the heating media, passing through the upper portion, has previously been relieved of part of its heat by the lower section is effected. The upper end of the section 3 is closed by a suitable cast iron header 12 having a peripheral shoulder 13 telescopingly fitting the upper margins of the walls of the section 3. The header 12 is provided with a passage 14 for discharging the products of combustion from the interior of the exchanger. Necessarily, the products of combustion impinging on the header 12 have been relieved of the greater portion of their heat. However, general radiation from the rest of the structure being upward, the header 12 is subjected to a comparatively high temperature and is therefore made of the heavier cast material for withstanding the same. Mounted on top of the header 12 is a supplemental flue header 15 which is in telescopingly fitting relation with the header 12 and sealed with respect thereto, the supplemental header 15 being removable for permitting access into the interior of the heat exchanging head for cleaning and servicing if necessary.

Leading from the supplemental header 15 is a discharge flue 16 which preferably extends horizontally rearwardly therefrom. At its discharge end the flue 16 is provided with vertical side wall portions 16a and a front vertical end wall portion 16b, these wall portions extending at right angles to each other. Adjacent these walls, there is no top or rear wall. The walls 16a and 16b depend from the end of the flue 16 and define an opening in communication with the interior of the room, this opening extending below the discharge passage of the main portion of the flue so as to relieve down drafts and prevent extinguishment of the burner flames due to outside wind conditions.

Mounted on the wall portions 16a is an adapter element 17 having a collar portion 17a adapted to snugly fit within a suitable discharge flue 18. The adapting element 17 is provided with an open portion in spaced relation to the collar portion 17a which is surrounded by a peripheral flange 17b, part of which flange extends horizontally, and the other part of which extends vertically so that the adapter can be mounted on the horizontal and vertical edges of the walls 16a of the flue with the collar 17a facing upwardly or horizontally and rearwardly, as desired. In this manner, the exchanger and flue may be readily connected with either a horizontal or a vertical flue.

As more fully set forth in my United States Letters Patent No. 2,023,136, air is supplied through the heater by a propeller fan F driven by a suitable motor M, the fan being substantially coextensive with the rear wall $2b$ of the heater. The discharge from such a fan is predicated upon discharge velocity head rather than pressure head and consequently, any obstruction to or any abrupt change in the direction of the flow of air would greatly decrease the efficiency and volume of flow. Since, however, the tubes are of the Venturi type, the openings through the rear wall are substantially coextensive in area with the rear wall $2b$ and impingement of air against the wall is reduced to a minimum. At the same time, due to the Venturi shape, the tubes are contracted sufficiently along the midportion of the heater from front to rear so that large surface area and adequate passages for the heating media between and around the tubes are provided. Should straight tubes be used, it is apparent that if the passages through the wall $2b$ were as large as those herein provided, there would be too great an obstruction of the passages for heating media and products of combustion around the tubes through the interior of the exchanger. Should smaller straight tubes be used, to obtain adequate passage for the heating media, the flow of air would be too greatly obstructed.

Again, due to the Venturi shape of the tubes, substantially no velocity head is lost by virtue of contraction of the air passages therethrough. On the contrary, the air is brought into more intimate contact with the tube walls and may expand freely so as to provide greater velocity of discharge than the velocity originally provided by the fan F.

Since the two sections of the exchanger are of different materials, each having a much different coefficient of expansion, it is necessary to provide some means for expansion compensation between the sections. For this purpose, the header 12 is provided at its ends with fins or flanges 20 which overhang the sections 2 and 3 and are in alignment with the end portions of the peripheral flange 9 of the section 2. Aligned passages or bores are provided through the corresponding portions of the flange 9 and the flanges 20, these bores extending vertically and receiving tie rods 21. The tie rods 21 are provided with heads $21a$ engaging the flange 9 at the face opposite to the section 3 and are threaded at the portions $21b$ which protrude beyond the upper limit of the flanges 20. Suitable nuts 22 are secured on the threaded ends of the tie rods for drawing the sections 2 and 3 firmly into telescoped relation for mounting the one on the other. Springs 23 are interposed between the upper faces of the flanges 20 respectively and the nuts 22 so that the sections are yieldably but positively held together in superimposed relation with respect to each other. Upon expansion of one relative to the other, however, the expansion is compensated by additional compression of the springs 23, the springs being sufficiently long axially of the tie rods so that at maximum expansion they are not fully compressed. As a result, warping or breaking of either section of the exchanger, misalignment of the tubes, change in contour of the walls, and leakage between the joints of the sections and of the header 12 are prevented.

While the invention has been described specifically as a heat exchanger in which heating media are passed through the interior and media to be heated are passed through the tubes, it may likewise be used for cooling one media by passage of cooling media through the body and the media to be cooled through the tubes, cooling being merely another manifestation of heat exchange. Again the heating or cooling media may be passed through the tubes to effect heat exchange with a media in the body, especially in those instances wherein a liquid in the body is to be chilled by air. In any event, the media introduced in the body preferably enters through the section composed of the material having the lower absorptive conduction and radiation characteristics.

The terms "heating media" and "heat", where used in the claims, is meant to include cooling media as a reasonable equivalent or mere reversal of the exchanging operation.

Having thus described my invention, I claim:

1. A heat exchanger comprising a hollow body composed of communicating hollow body sections providing a continuous passage therethrough, each of said sections being of a different material having different heat conduction and heat radiation qualities, said sections being mounted in abutting relation with respect to each other and sealed at the juncture, a header on one section, means connected to another section remote from the header and yieldably connected to the header and urging the header toward the remote section whereby the sections are held together and differences in expansion and contraction of the sections may be compensated and relieved, and means for admitting heating media into the body.

2. A heat exchanger comprising a hollow body composed of a pair of communicating sections in superimposed relation with respect to each other and providing a continuous passage therethrough for fluid, each of said sections being of a different material having different qualities of heat conduction and radiation, a header on the top section, a rod connected to the lower section and extending upwardly beyond the header, an abutment on the extending portion of the rod and spaced from the header, a compression spring interposed between the abutment and header yieldably urging said header against the top section and toward the bottom section whereby the differences in expansion and contraction of the sections may be compensated and relieved and the sections held together, and means to admit fluid into the body.

3. A heat exchanger comprising a plurality of communicating hollow body sections in end to end relation with respect to each other and providing a continuous passage arranged for receiving heating media at one end and for discharging said media at the opposite end, each section having a plurality of tubes extending therethrough transversely of the passage for passage of a forced stream of air to be heated, the tubes being uncommunicated with the interior of the body, said sections being composed of different materials respectively, said materials having different characteristics of heat conductivity and heat radiation, the sections having progressively greater heat conductivity and greater heat radiation characteristics successively in the direction of flow of the heating media through said continuous passage, and means to force air to be heated through said tubes, whereby the air stream from said exchanger may be more nearly uniformly heated.

4. A heat exchanger comprising a hollow body having a continuous passage therethrough for heating media and providing passages extending transversely of the path of flow of said media for the flow of air into heat exchanging relation with said body, means for blowing air through said last mentioned passages, said body being composed of different materials having different characteristics of heat conductivity and heat radiation, the conductivity and heat radiation characteristics of said body portions progressively increasing in the direction of flow of the heating media through the body, whereby the stream of air blown into heating relation with said body is more uniformly heated.

GEORGE HERBSTER.